UNITED STATES PATENT OFFICE.

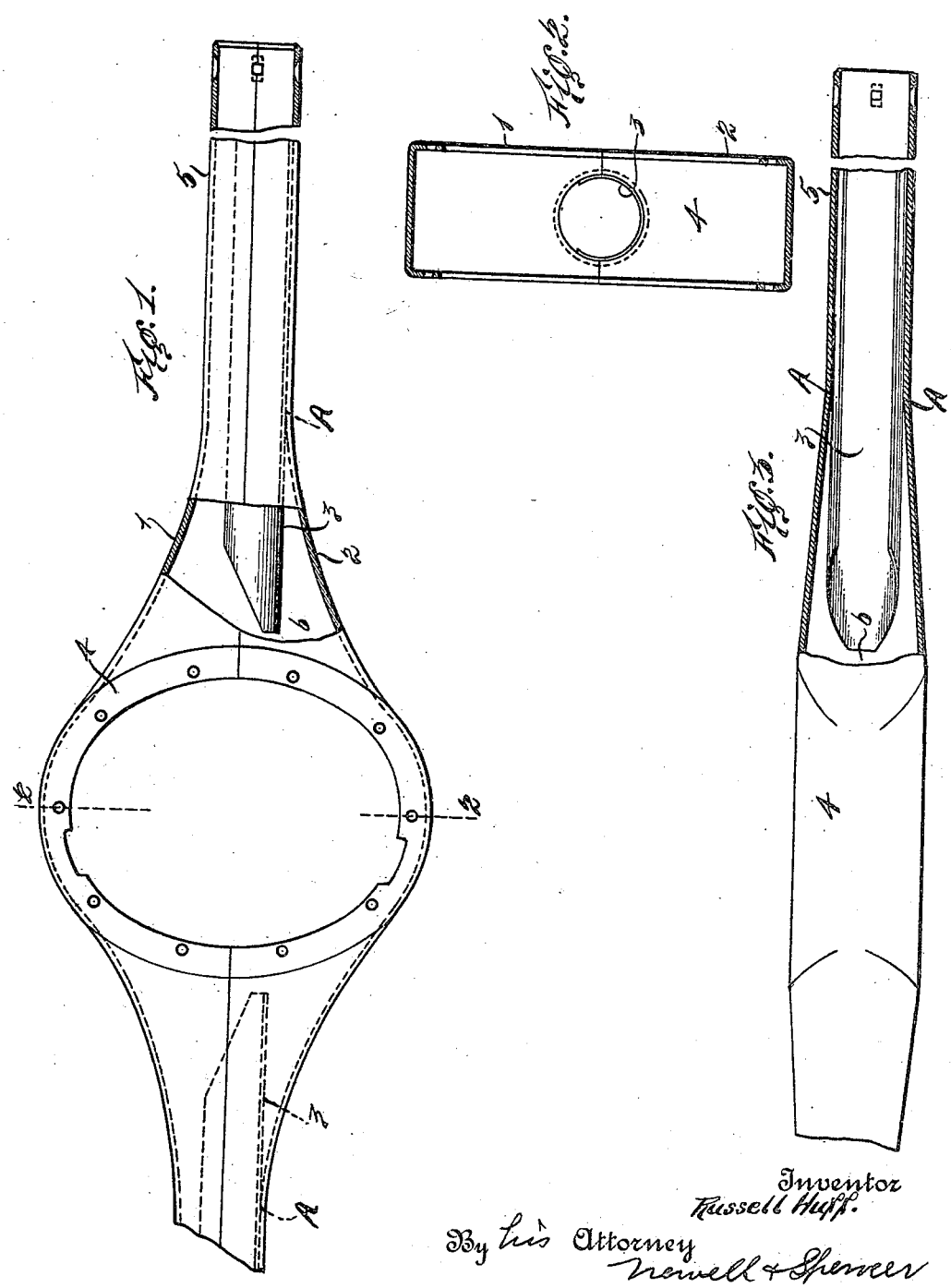

RUSSELL HUFF, OF DETROIT, MICHIGAN, ASSIGNOR TO DODGE BROTHERS, OF DETROIT, MICHIGAN, A CORPORATION OF MICHIGAN.

REAR-AXLE HOUSING.

1,410,758.     Specification of Letters Patent.     Patented Mar. 28, 1922.

Application filed November 1, 1920. Serial No. 420,878.

*To all whom it may concern:*

Be it known that I, RUSSELL HUFF, a citizen of the United States, residing at Detroit, Michigan, have invented certain new and useful Improvements in Rear-Axle Housings, of which the following is a clear, full, and exact description.

My invention relates to axle housings for motor vehicles and a general object of the invention is to simplify the construction and facilitate the manufacture of axle housings of the general type such as that shown and described in U. S. Letters Patent No. 1,209,134 to J. F. and H. E. Dodge granted December 19, 1916, and such as that shown and described in the U. S. application of Russell Huff No. 370,703, filed April 2, 1920.

Both in the construction of the patent and in the construction shown in the application, the axle housing is formed of sheet metal whose rigidity is increased by the provision of cylindrical reinforcing tubes inserted into the ends of the housing. With the present construction, however, it has been found that by making the sheet metal stampings of the housing sufficiently heavy, the additional strength afforded by the tubes of the prior constructions is not required.

In the construction shown in the application above referred to, the inserted tubes not only lent additional strength to the structure, but also performed the additional function of preventing lubricant in the central enlargement of the housing which contains the gears, from flowing towards the outer ends of the housing and leaking out, sometimes causing trouble by getting on to the brake shoes.

In the present invention the function of preventing oil in the gear chamber from running along the bottom of the housing to the ends thereof, is very effectively accomplished by means of baffle plates which are made of comparatively light material so that the whole structure can be manufactured with greater readiness, and with the same weight of metal as used in the old form of housing a strength of approximately 50% greater may be obtained.

Various features and advantages in addition to those enumerated will be apparent from the following detailed description and claims when taken in connection with the accompanying drawing, in which—

Fig. 1 is an elevation of my improved axle housing.

Fig. 2 is a section on the line 2—2 of Fig. 1.

Fig. 3 a part sectional and part plan view.

Referring to the drawings, the housing is composed of an upper sheet metal stamping 1, and a lower sheet metal stamping 2, both similar in shape, said stampings being united by welding on a horizontal plane passing through the geometrical centre of the housing. The housing is made of metal having sufficient weight so that no reinforcements of any kind are required. In order, however, to prevent oil which is used in the central chamber to lubricate the differential mechanism located therein, from flowing along the bottom of the housing to the ends thereof where it may cause trouble, I provide baffle plates 3, which extend below the horizontal median line of the housing, which plates are concave in shape, the concavity being on the upper side so that when the axle is inserted in the housing the baffle plates will conform somewhat to the shape of the axle. The housing comprises a central enlargement 4 and tapering cylindrical ends 5, and the baffle plates are spot-welded or otherwise suitably fastened to the cylindrical ends of the housing, and said baffle plates extend substantially to the central enlargement of the housing as indicated at 6, Figs. 1 and 3. From the position of the parts shown in Fig. 1, it will be seen that the baffle plate at the right is in contact with the lower cylindrical wall of the housing up to about the position indicated by the letter A. Any lubricant, therefore, in the chamber formed by the central enlargement of the housing, which is below the level of the end of the baffle plate at 6 cannot flow along the bottom of the chamber towards the ends thereof, and by reason of the fact that the baffle plates extend substantially to the gear chamber a considerable inclination of the axle of the vehicle with respect to the horizontal may be permitted without any flow of oil inside the baffle plates.

It is, of course, understood that variations may be resorted to within the scope of my invention without departing from the spirit thereof.

Having thus described my invention, what I claim and desire to secure by Letters Patent is:

1. An axle housing comprising a sheet metal casing of sufficiently heavy material to require no reenforcement, said casing having a central enlargement and cylindrical end portions, baffle plates of light metal secured to the end portions only of the casing and extending substantially to the central enlargement thereof.

2. An axle housing comprising a sheet metal casing of sufficiently heavy material to require no reenforcement, said casing having a central enlargement and cylindrical end portions, trough-shaped baffle plates of light material secured to the end portions only of the casing and extending substantially to the central enlargement thereof, said baffle plates having their greater portion occupying a position below the median line of the housing whereby any lubricant whose level in the central enlargement is below that of the inner ends of said plates is prevented from flowing along the bottom of said housing to the ends thereof.

Signed at Detroit, Michigan, this 13th day of October, 1920.

RUSSELL HUFF.

Witnesses:
 WM. E. SHOEMAKER,
 J. R. FURSE.